United States Patent
Wood

(10) Patent No.: US 10,012,281 B2
(45) Date of Patent: Jul. 3, 2018

(54) IMPACT ABSORBING STRUCTURE

(71) Applicant: Plastic Castle Limited, West Midlands (GB)

(72) Inventor: John Wood, Staffordshire (GB)

(73) Assignee: PLASTIC CASTLE LIMITED, West Midlands (GB)

( * ) Notice: Subject to any disclaimer, the term of this patent is extended or adjusted under 35 U.S.C. 154(b) by 263 days.

(21) Appl. No.: 14/769,536

(22) PCT Filed: Feb. 19, 2014

(86) PCT No.: PCT/GB2014/050478
§ 371 (c)(1),
(2) Date: Aug. 21, 2015

(87) PCT Pub. No.: WO2014/128454
PCT Pub. Date: Aug. 28, 2014

(65) Prior Publication Data
US 2016/0003318 A1 Jan. 7, 2016

(30) Foreign Application Priority Data
Feb. 21, 2013 (GB) .................... 1303048.1

(51) Int. Cl.
*F16F 1/44* (2006.01)
*F16F 1/36* (2006.01)
*A41D 13/05* (2006.01)
*B32B 3/12* (2006.01)
*B32B 3/16* (2006.01)
(Continued)

(52) U.S. Cl.
CPC ............ *F16F 1/44* (2013.01); *A41D 13/0156* (2013.01); *B32B 3/12* (2013.01); *B32B 3/16* (2013.01); *F16F 1/3605* (2013.01); *F16F 3/0876* (2013.01)

(58) Field of Classification Search
CPC ...... F16F 1/02; F16F 1/44; F16F 1/376; F16F 1/3605; F16F 3/0873; F16F 3/0876; F16F 7/12; F16F 7/121; F16F 7/123; F16F 7/125; F16F 9/306; F16F 9/0472; F16F 2230/10; F16F 2236/02; F16F 2236/04; A47C 7/16; A47C 7/30; A47C 7/025; A47C 7/287; A41D 13/0156; B60R 19/34;
(Continued)

(56) References Cited

U.S. PATENT DOCUMENTS 2,346,161 A * 4/1944 Grant ..................... B65D 85/32
217/26.5
3,251,076 A * 5/1966 Burke ..................... F16F 1/376
188/268

(Continued)

FOREIGN PATENT DOCUMENTS

JP  2013014855 A * 1/2013 ............... A42B 1/08
JP  2013014855 A * 1/2013 ............... A42B 1/08

*Primary Examiner* — Robert A. Siconolfi
*Assistant Examiner* — San M Aung
(74) *Attorney, Agent, or Firm* — Shumaker, Loop & Kendrick, LLP

(57) ABSTRACT

An impact absorbing structure includes a first inter-engaging main planar part and a second inter-engaging main planar part. The first main planar part includes a plurality of cylindrical projections engageable in corresponding flexible hollow members such that as the cylindrical projections enter and subsequently deform the hollow members, impact absorption takes place.

19 Claims, 6 Drawing Sheets

(51) Int. Cl.
*A41D 13/015* (2006.01)
*F16F 3/087* (2006.01)

(58) Field of Classification Search
CPC .............. B60R 21/0428; Y10S 297/08; Y10T 428/24149; Y10T 428/24174; B32B 3/12; B32B 3/16
USPC .......... 188/377, 268, 298; 267/80, 141, 144; 2/455
See application file for complete search history.

(56) References Cited

U.S. PATENT DOCUMENTS

| | | | |
|---|---|---|---|
| 6,295,654 B1* | 10/2001 | Farrell | A41D 13/0153 2/108 |
| 2002/0017805 A1* | 2/2002 | Carroll, III | A62B 1/22 296/187.03 |
| 2002/0185795 A1* | 12/2002 | Le | B60R 21/04 267/80 |
| 2005/0133324 A1* | 6/2005 | Soto Bailon | B60R 21/04 188/377 |
| 2005/0200062 A1* | 9/2005 | Maurer | F16F 7/08 267/144 |
| 2012/0164388 A1* | 6/2012 | Skjetne | B32B 3/12 428/166 |

* cited by examiner

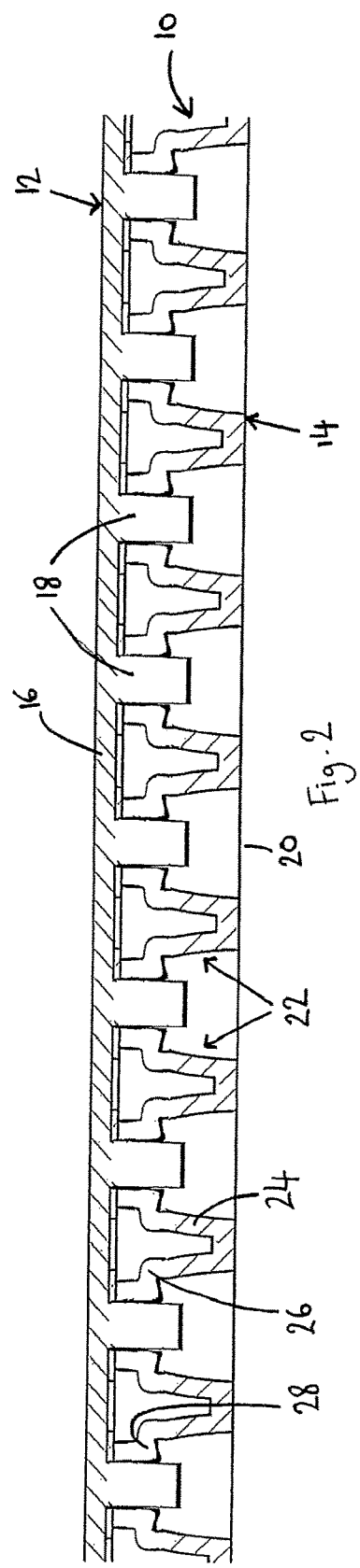
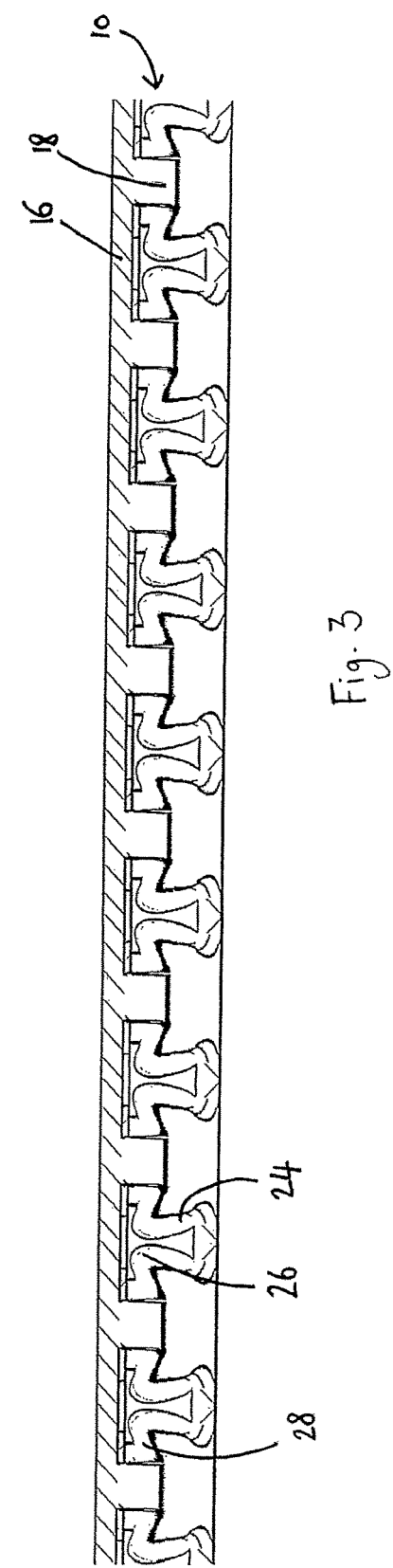

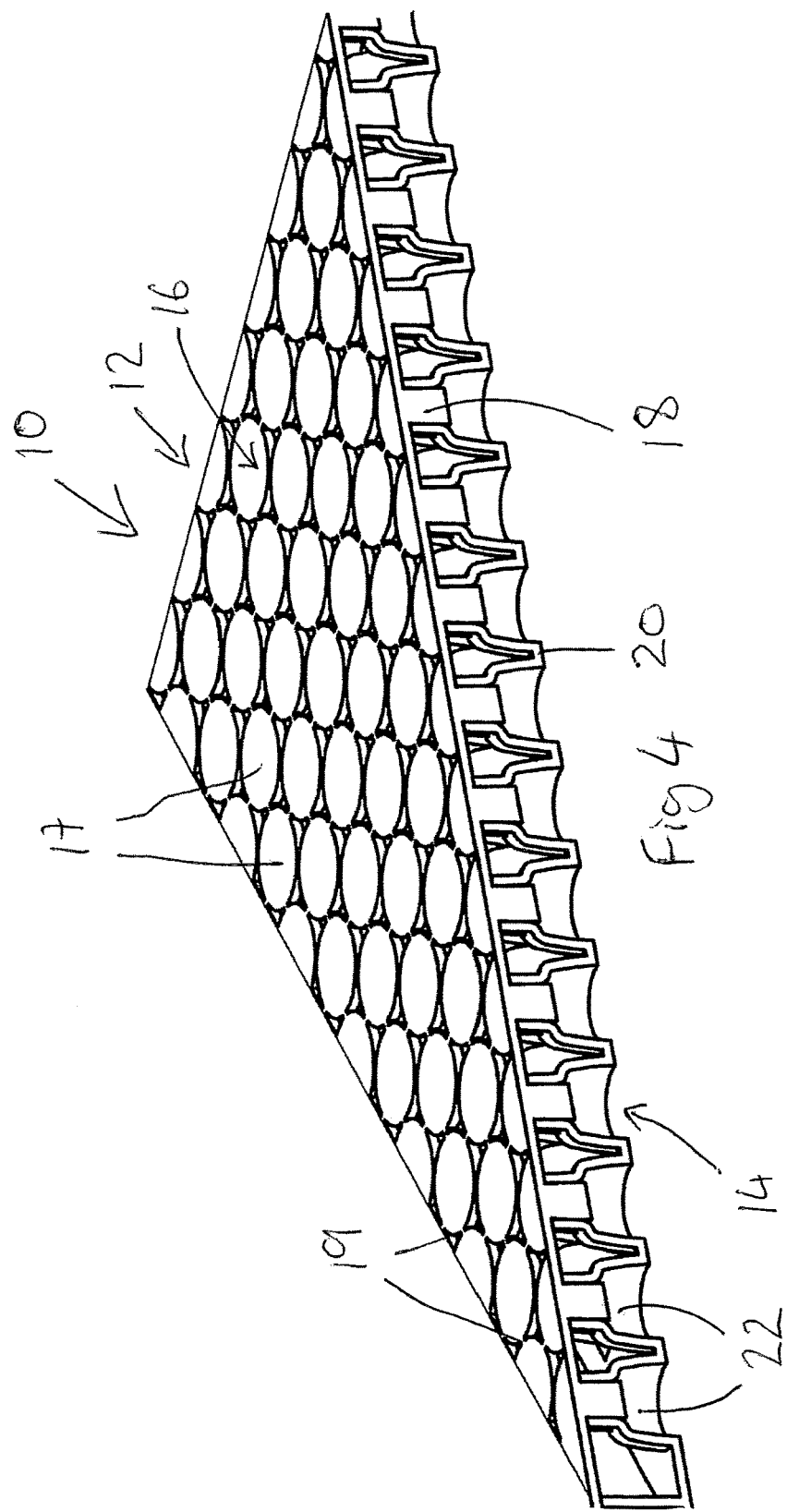

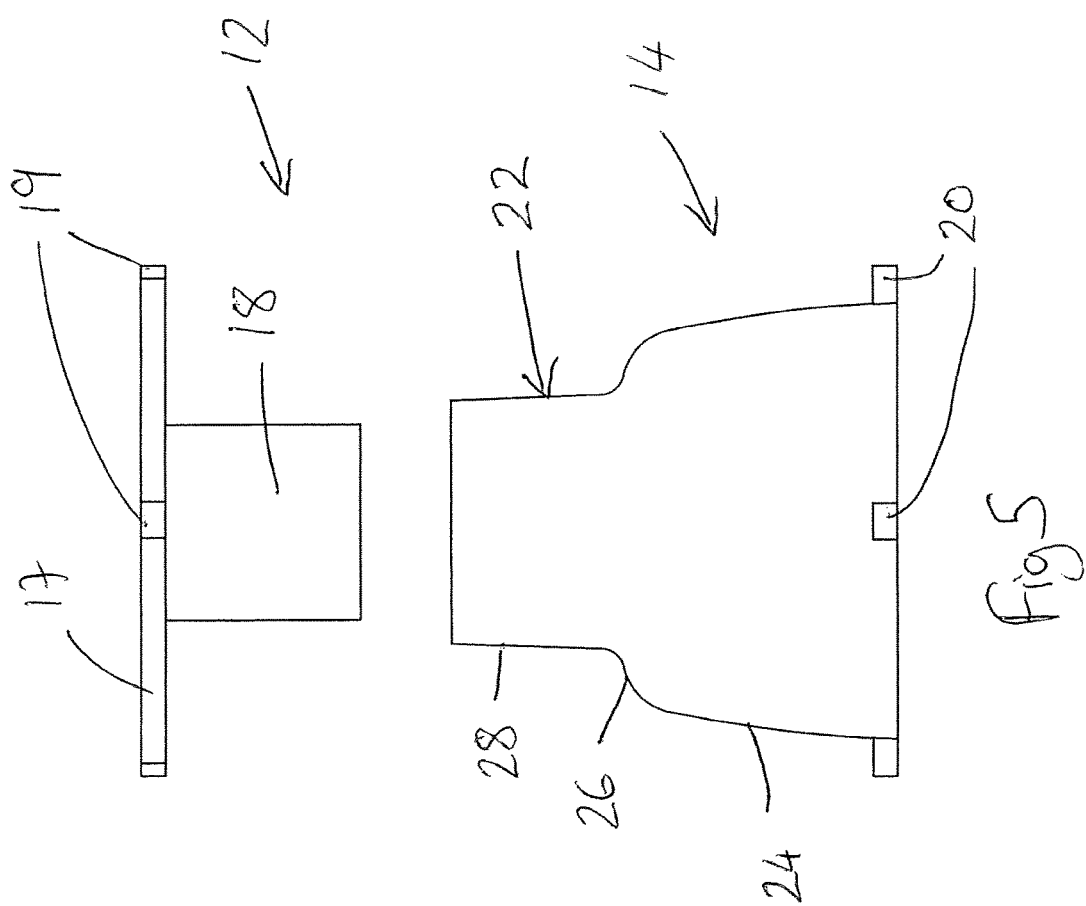

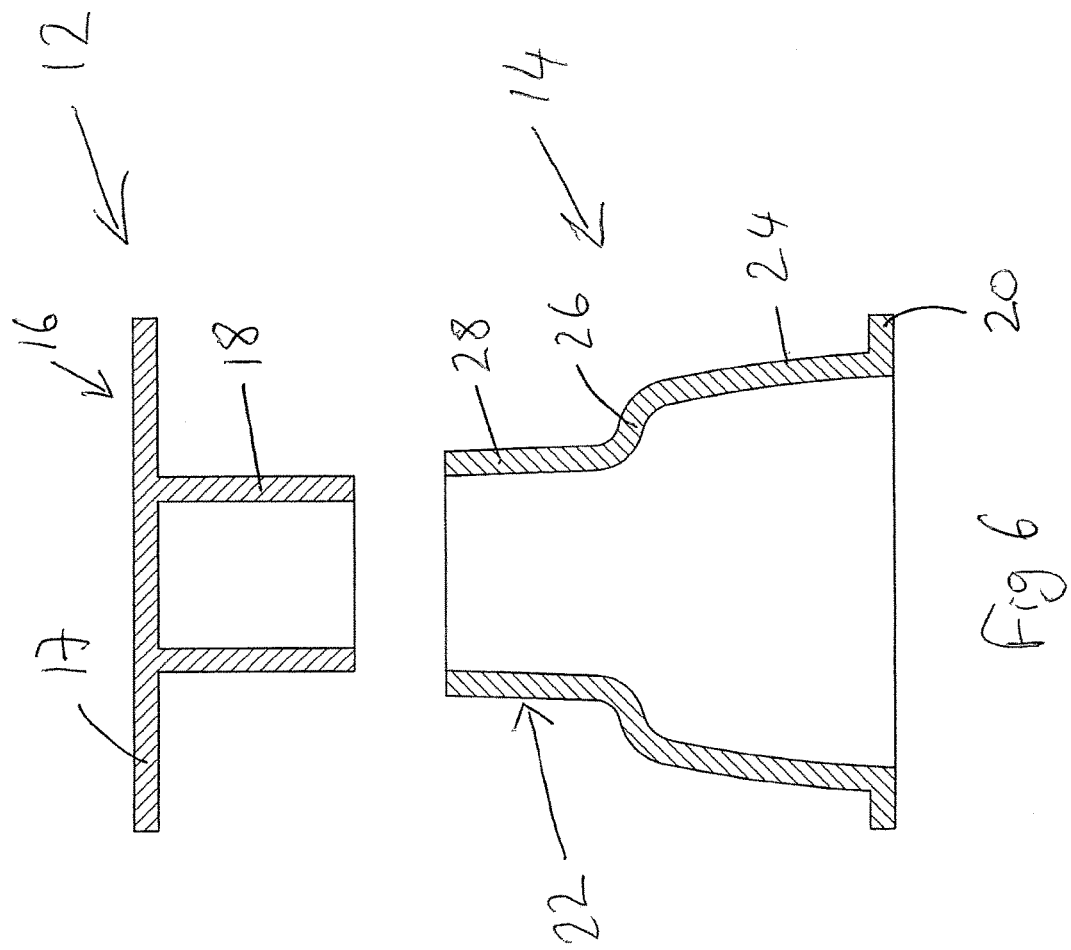

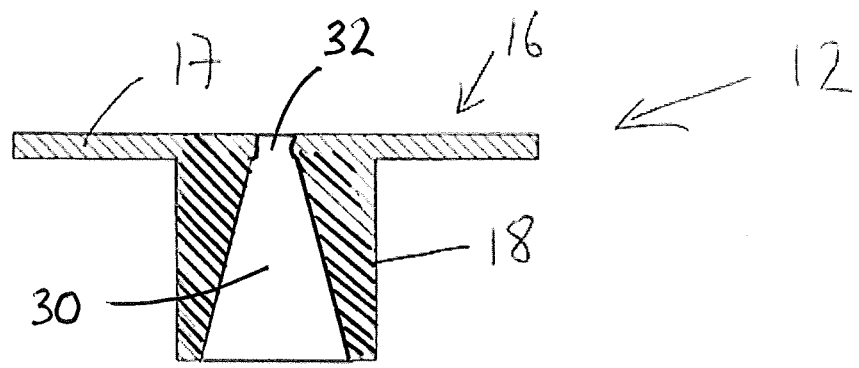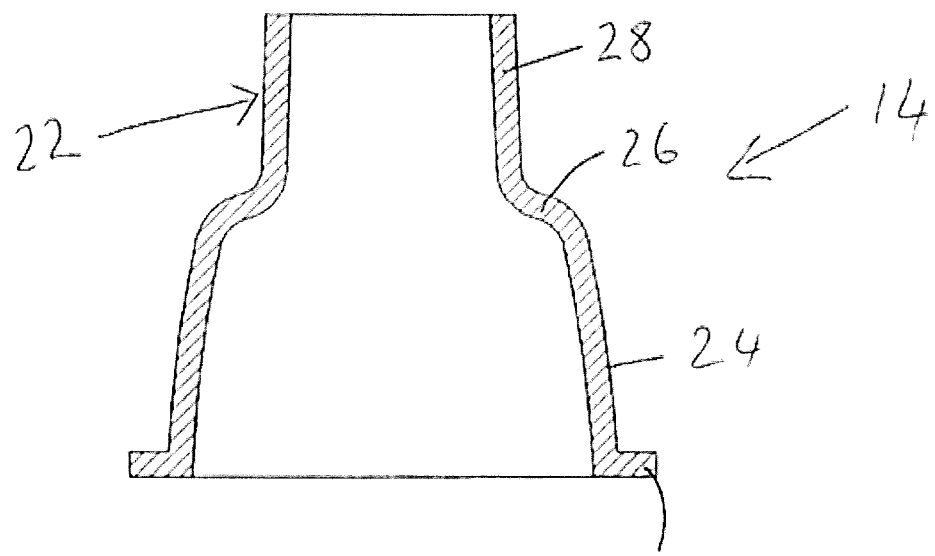
Fig 7

IMPACT ABSORBING STRUCTURE

CROSS-REFERENCE TO RELATED APPLICATION

This patent application is a United States national phase patent application based on PCT/GB2014/050478 filed Feb. 19, 2014, the entire disclosure of which is hereby incorporated herein by reference.

This invention concerns an impact absorbing structure, and also an article made from a material with such a structure.

Impact absorbing structures are used in a wide range of applications, and are used for instance in clothing for sportsmen such as cyclists, skateboarders, snowboarders, rugby or American football players, and also motorcyclists.

There are a number of characteristics which are desired for such structures, and particularly when to be worn by a person. These features include being lightweight, providing consistent performance upon impact, providing low degradation, flexibility, and possibly also breathability. Furthermore it is desirable for such structures to be manufacturable by existing processes, and to provide products which can be designed/adapted for particular uses. It is also desirable for such products to be recyclable.

According to a first aspect of the invention there is provided an impact absorbing structure, the structure including a first main part including a flexible planar backing member and a plurality of projection members extending from the backing member, and a second main part including a flexible planar backing member and a plurality of flexible hollow members extending from the backing member, the structure being configured such that the backing members face each other and the hollow members each locate a projection member extending thereinto, and as the first and second members are urged together for instance when the structure is impacted, the projection members located within the hollow members cause the respective hollow members to deform.

The flexible hollow members may have a hollow distal part of smaller diameter than a hollow proximal part. The hollow distal part and/or the hollow proximal part may taper inwardly away from the backing member.

The hollow distal part and the hollow proximal part may be interconnected by a collar part, which collar part tapers inwardly away from the backing member at a greater rate than the hollow proximal part.

The hollow distal part may taper at a lesser rate than the hollow proximal part.

The hollow distal part and/or the hollow proximal part may be substantially cylindrical.

Openings may be provided through the second main part backing member at positions corresponding to the flexible hollow members. Openings may be provided through the second main part backing member at positions other than corresponding to the flexible hollow members, and the backing member may be in the form of a plurality of tabs extending between adjacent flexible hollow members.

The flexible hollow members may be provided in a regular pattern on the backing member, and may be provided in a number of rows, which rows may be offset relative to each other.

The second main part may be made of a plastics material, and may be made of a thermoplastics material, and may be made of any of SEBS, TPE or TPU.

The maximum diameter of the hollow proximal part may be substantially equal to the length of the hollow member from the backing member.

The projections on the first main part may be substantially cylindrical and may taper inwardly away from the backing member.

Openings may be provided through the first main part backing member. The first main part backing member may be in the form of a plurality of circular members joined together by tabs, with the circular members being coaxial with the projection members, and of greater diameter than the projection members.

The projections on the first member may be hollow.

An open ended passage may be provided through the projections on the first main part and the passage may taper away from the second main parts.

The projections on the first main part member may be of a size to be retained in the hollow distal parts of the flexible hollow members in a friction fit.

The first main part may be made of a harder material than the second main part.

The first main part may be made of a plastics material, which may be a thermoplastics material, and may be any of carbon fibre, silicone or polycarbonate.

The thickness of material in the first and/or second main parts may vary thereacross.

According to a second aspect of the invention there is provided an article made from a structure according to any of the preceding seventeen paragraphs.

The article may be wearable by a person, and may be protective clothing for a motorcyclist or sportsman.

An embodiment of the present invention will now be described by way of example only and with reference to the accompanying drawings, in which:

FIG. 2 is a similar view to FIG. 1 but with pressure being applied to the structure;

FIG. 3 is a similar view to FIG. 2 but with further pressure being applied to the structure;

FIG. 4 is a perspective cutaway view of the structure of FIG. 1 in a relaxed condition;

FIG. 5 is a diagrammative side view of components of the structure of FIG. 1;

FIG. 6 is a similar view to FIG. 5 but in cross section; and

FIG. 7 is a similar view to FIG. 6 but of a modified structure according to the invention.

Figure 1:
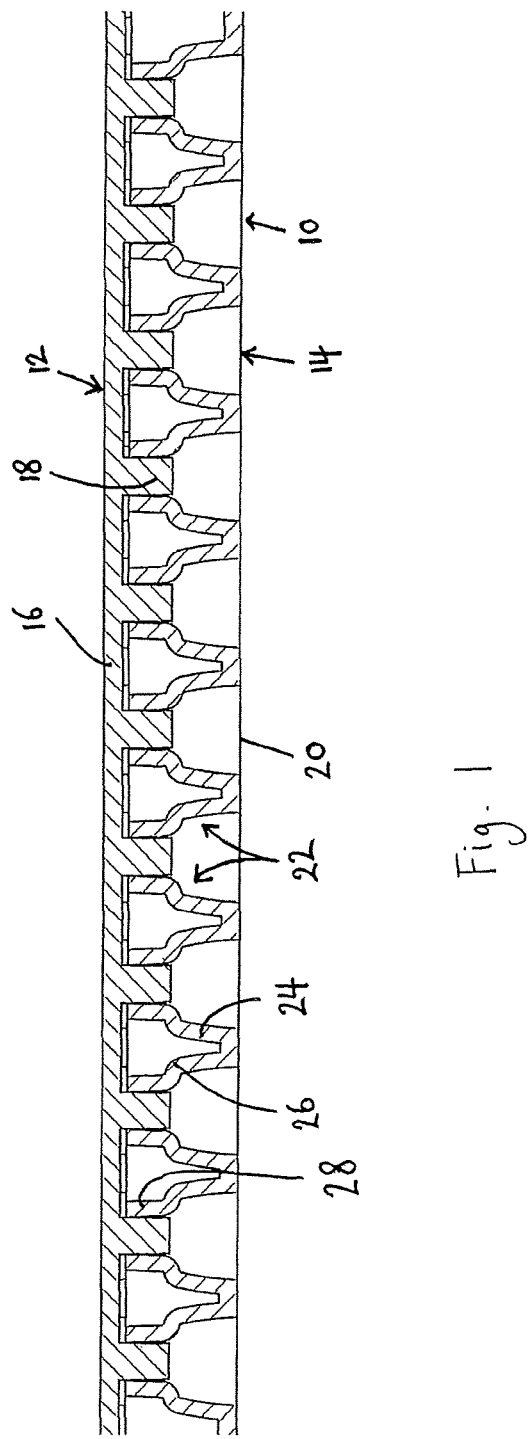
FIG. 1 is a diagrammatic cross sectional view of a structure according to the invention in a relaxed condition.

The drawings show an impact absorbing structure 10 suitable for use for instance in impact absorbing clothing or padding for sportsmen, motorcyclists or otherwise. The structure comprises first and second main parts 12, 14 interengaging together. The first main part 12 which is shown uppermost in the drawings comprises a planar backing member 16 from which extend a plurality of cylindrical projections 18, which projections taper inwardly a small amount away from the backing member 16. The projections 18 may be hollow. The projections 18 are arranged in a regular pattern on the backing member 16, and are arranged in a plurality of rows which are substantially equally offset relative to adjacent rows.

The backing member 16 is in the form of a plurality of circular members 17 which are coaxial with the projections 18 and of greater diameter. The circular members 17 are connected to adjacent such members 17 by four equispaced radial tabs 19.

The second main part 14 comprises a planar backing member 20 which is in fact in the form of a plurality of tabs.

A plurality of flexible hollow members 22 are upstanding from the backing member 20. The hollow members 22 have a proximal hollow part 24 which is lowermost in the drawings. The part 24 is substantially cylindrical and tapers inwardly away from the backing member 20.

A collar member 26 extends around the top of each of the proximal parts 24 and tapers inwardly to a greater degree than the proximal parts 24. Extending from the distal end of the collar members 26 are distal hollow parts 28. The distal hollow parts are substantially cylindrical and taper away from the backing member 20 to a lesser degree than the proximal parts 24. The distance from the backing member 20 to the distal end of the distal parts 28 is substantially equal to the diameter of the proximal parts 24 adjacent the backing member 20.

As indicated the backing member 20 is in the form of a plurality of tabs, and again four radially extending tabs are provided, in this instance extending from the lower edge of the hollow part 24.

The projections 18 are a friction fit within the distal hollow parts 28, and it may be that the hollow parts 28 have to be deformed to receive the projections 18. This friction fit will retain the first and second main parts 12, 14 together.

In use, if the structure 10 is impacted, the first and second main parts 12, 14 will be urged together, and a first example of this is illustrated in FIG. 2. The backing member 16 of the first part 12 is engaged against the distal ends of the distal hollow parts 28, causing these to deform, and to be pushed inwardly causing deformation of the collar members 26.

Further impact is illustrated in FIG. 3 where the distal hollow parts 28 have been fully compressed, and the proximal parts 24 have been caused to bow outwardly. Once the pressure causing the above described deformation has been taken away, the structure 10 will return to the condition shown in FIG. 1. The deformation of the different parts of the second main part 14 causes absorption of energy from the impact.

There is thus described an impact absorbing structure which provides for consistent absorption of impact energy applied thereto, whilst retaining the resilience of the structure. The structure described is relatively lightweight and can readily be manufactured. This structure can be made to be very flexible, with energy being absorbed across a number of different members within the structure.

It is to be realised that the materials chosen for the structure, and the size of the respective members and the thickness of the structure can be chosen dependent on the required application. In general the first main part will be of harder material than the second main part.

In this instance the first main part may be made of a plastics material, and for soft absorption could be silicone, or for harder absorption could be polycarbonate. Also it is to be realised that other thermoplastics materials or other materials such as carbon fibre could be used for this part. The second main part may be made of a plastics material and this could be TPE, TPU or SEBS.

FIG. 7 shows a modified structure which is similar in most respects to that shown in FIGS. 1 to 6. Accordingly, corresponding reference numerals have been used. In this instance the projections 18 and the first main part 12 are a little different. A through passage 30 is provided which tapers towards the backing member 16 and a relatively small opening 32 is provided at the end of the passage 30 through the backing member 16. This arrangement allows the trapped air to be released, and the relative size of the opening 32 controls the amount of damping provided. It is to be realised that by varying the amount of taper and/or the hole size, different amounts of damping can be achieved.

Various other modifications may be made without departing from the scope of the invention. For instance the thickness of material across the first and/or second main parts may be varied so as to provide different amounts of impact absorption at different places. This could be used in a wide range of scenarios, such as different areas in clothing, or for instance in linings for footwear.

This structure has been found to have a wide range of energy absorption profile, which remains constant with use. The structure is lightweight as much of the volume is air. Energy is absorbed by the movement and displacement of the components, which acts in a non-linear way to absorb energy better than a standard foam or purely geometric system.

The structure is such that its performance upon impact is not degraded by the choice of material used in forming the structure. Air will be trapped in the structure in use which will cause the hollow members to bellow out, providing additional impact resistance.

The offset structure and nature of the projections and hollow members and the links between adjacent projections and hollow members, provides flexibility across uneven or curved surfaces without loss of function, providing a perpendicular point across any impact zone.

The offset structure helps to prevent the structure from folding along a line, furthermore, the offset structure permits closer spacing between the respective projections and hollow members, thereby providing a greater surface to prevent acute trauma.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An impact absorbing structure comprising:
 a first main part including a flexible planar backing member and a plurality of projection members extending from the backing member of the first main part; and
 a second main part including a flexible planar backing member and a plurality of flexible hollow members extending from the backing member of the second main part, a plurality of first openings provided through the backing member of the second main part at positions corresponding to the flexible hollow members, a plurality of second openings provided through the backing member of the second main part at positions other than corresponding to the flexible hollow members, wherein the backing member of the first main part faces the backing member of the second main part, wherein each of the flexible hollow members locates one of a plurality of projection members extending therein, and wherein the first main part and the second main part are urged together when the impact absorbing structure is impacted and the projection members located within the flexible hollow members cause the flexible hollow members to deform, wherein the backing member of the first main part is in the form of a plurality of circular members joined together by tabs, wherein the circular members are coaxial with the projection members of the first main part and have a diameter greater than a diameter of the projection members of the first main part.

2. The structure according to claim 1, wherein the flexible hollow members have a hollow distal part and a hollow proximal part, the hollow distal part having a diameter smaller than a diameter of the hollow proximal part.

3. The A structure according to claim 2, wherein at least one of the hollow distal part and the hollow proximal part taper inwardly when moving in a direction away from the backing member of the second main part.

4. The structure according to claim 3, wherein the hollow distal part and the hollow proximal part are interconnected by a collar part, wherein the collar part tapers inwardly when moving in the direction away from the backing member of the second main part at a greater rate than the at least one of the hollow distal part and the hollow proximal part.

5. The structure according to claim 3, wherein both the hollow distal part and the hollow proximal part taper inwardly when moving in the direction away from the backing member of the second main part and the hollow distal part tapers at a lesser rate than the hollow proximal part.

6. The structure according to claim 2, wherein at least one of the hollow distal part and the hollow proximal part is substantially cylindrical.

7. The structure according to claim 1, wherein the backing member of the second main part is in the form of a plurality of tabs extending between adjacent ones of the flexible hollow members.

8. The structure according to claim 1, wherein the flexible hollow members are provided in a regular pattern on the backing member of the second main part and are provided in a plurality of rows on the backing member of the second main part, and wherein the rows are offset relative to each other.

9. The structure according to claim 1, wherein the second main part is produced from a thermoplastic material including at least one of SEBS, TPE, and TPU.

10. An impact absorbing structure comprising:
a first main part including a flexible planar backing member and a plurality of projection members extending from the backing member of the first main part; and
a second main part including a flexible planar backing member and a plurality of flexible hollow members extending from the backing member of the second main part, a plurality of first openings provided through the backing member of the second main part at positions corresponding to the flexible hollow members, a plurality of second openings provided through the backing member of the second main part at positions other than corresponding to the flexible hollow members, wherein the backing member of the first main part faces the backing member of the second main part, wherein each of the flexible hollow members locates one of a plurality of projection members extending therein, and wherein the first main part and the second main part are urged together when the impact absorbing structure is impacted and the projection members located within the flexible hollow members cause the flexible hollow members to deform, wherein the flexible hollow members have a hollow distal part and a hollow proximal part, the hollow distal part having a diameter smaller than a diameter of the hollow proximal part, and wherein a maximum diameter of the hollow proximal part is substantially equal to a length of the flexible hollow members from the backing member of the second main part.

11. The structure according to claim 1, wherein the projection members of the first main part are substantially cylindrical and taper inwardly when moving in a direction away from the backing member of the first main part.

12. An impact absorbing structure comprising:
a first main part including a flexible planar backing member and a plurality of projection members extending from the backing member of the first main part; and
a second main part including a flexible planar backing member and a plurality of flexible hollow members extending from the backing member of the second main part, a plurality of first openings provided through the backing member of the second main part at positions corresponding to the flexible hollow members, a plurality of second openings provided through the backing member of the second main part at positions other than corresponding to the flexible hollow members, wherein the backing member of the first main part faces the backing member of the second main part, wherein each of the flexible hollow members locates one of a plurality of projection members extending therein, and wherein the first main part and the second main part are urged together when the impact absorbing structure is impacted and the projection members located within the flexible hollow members cause the flexible hollow members to deform, wherein a plurality of openings is provided through the backing member of the first main part.

13. The structure according to claim 1, wherein an open ended passage is provided through the projection members of the first main part and the passage tapers in a direction moving away from the second main part.

14. The structure according to claim 2, wherein the projection members of the first main part are retained in the hollow distal parts of the flexible hollow members by a friction fit.

15. The structure according to claim 1, wherein the first main part is produced from a material harder than a material from which the second main part is produced.

16. The structure according to claim 1, wherein the first main part is produced from a thermoplastic material including at least one of carbon fiber, silicone, and polycarbonate.

17. The structure according to claim 1, wherein a thickness of at least one of the first main part and the second main part varies.

18. An article produced from a structure according to claim 1.

19. The article according to claim 18, wherein the article is wearable by a person and is protective clothing for one of a motorcyclist and a sportsman.

* * * * *